United States Patent [19]

Aoki

[11] Patent Number: 4,844,828
[45] Date of Patent: Jul. 4, 1989

[54] DETERGENT DISPENSER POUCH MADE OF COLD WATER-SOLUBLE PVA CONTAINING ACETALIZED UNITS

[75] Inventor: Masakazu Aoki, Chiba, Japan

[73] Assignee: Kao Corporation, Tokyo, Japan

[21] Appl. No.: 172,466

[22] Filed: Mar. 24, 1988

Related U.S. Application Data

[63] Continuation-in-part of Ser. No. 911,968, Sep. 26, 1986, abandoned.

[30] Foreign Application Priority Data

Sep. 27, 1985 [JP] Japan ............................... 60-214079
May 9, 1986 [JP] Japan ............................... 61-106401

[51] Int. Cl.⁴ ...................... B65D 85/84; C08F 8/28; C08F 8/38; C11D 17/00
[52] U.S. Cl. .................................... 252/90; 206/524.7; 252/174.23; 252/DIG. 3; 252/93; 525/61
[58] Field of Search ............... 525/61; 252/90, 174.23, 252/DIG. 3; 206/524.7

[56] References Cited

U.S. PATENT DOCUMENTS

| | | | |
|---|---|---|---|
| 3,198,740 | 8/1965 | Dunlop | 252/90 |
| 3,300,546 | 1/1967 | Baechtold | 252/93 |
| 3,413,229 | 11/1968 | Bianco | 252/90 |
| 3,510,542 | 5/1970 | Strand | 252/90 |
| 3,629,140 | 12/1971 | Bayless | 252/316 |
| 3,634,260 | 1/1972 | Pickin | 252/95 |
| 3,926,918 | 12/1975 | Shibata et al. | 525/61 |
| 3,963,618 | 6/1976 | Muir | 525/61 |

FOREIGN PATENT DOCUMENTS

| | | | |
|---|---|---|---|
| 0602855 | 8/1960 | Canada | 525/61 |
| 0157612 | 10/1985 | European Pat. Off. | 252/90 |
| 2245676 | 4/1975 | France | |
| 0138091 | 10/1979 | Japan | |
| 0078837 | 6/1981 | Japan | 525/61 |
| 0682194 | 11/1952 | United Kingdom | 525/61 |
| 1482914 | 8/1977 | United Kingdom | |
| 1567280 | 5/1980 | United Kingdom | |

Primary Examiner—Dennis Albrecht
Assistant Examiner—Kathlene Markowski
Attorney, Agent, or Firm—Birch, Stewart, Kolasch & Birch

[57] ABSTRACT

A pouched powder detergent is disclosed which comprises a powder detergent and a pouch containing the powder detergent, wherein the pouch comprises a cold water-soluble polyvinyl alcohol derivative containing 70 to 90 mole % of vinyl alcohol units, 0 to 2 mol % of vinyl acetate units and 10 to 30 mol % of acetalized vinyl alcohol units having an alkyl group containing 0.34 to 1.70 carbon atoms on the average, and having a viscosity-average polymerization degree of 200 to 500 with respect to the vinyl monomer units.

3 Claims, No Drawings

DETERGENT DISPENSER POUCH MADE OF COLD WATER-SOLUBLE PVA CONTAINING ACETALIZED UNITS

This application is a continuation-in-part of application Ser. No. 911,968, filed on Sept. 26, 1986, now abandoned.

BACKGROUND OF THE INVENTION

The present invention relates to a detergent dispenser which comprises a powder detergent and a pouch or bag containing the powder detergent, wherein the pouch is made of a cold water soluble polyvinyl alcohol derivative. The pouch of the present invention is resistant to acid and to alkali and can retain its solubility over a long period of time. The pouch or bag containing the powder detergent is capable of dissolving when it is placed into water.

Polyvinyl alcohol (hereinafter referred to as "PVA") is a water-soluble polymer which is widely used for water-soluble films and in other fields. PVA which has a degree of saponification ranging from 80 to 95 mol % exhibits a rapid water solubility. PVA which has a degree of saponification of at least 98 mol % is called "completely saponified PVA" and is dissolved in water when it is allowed to stand in the water for a long period of time or if it is placed into hot water. However, completely saponified PVA does not promptly dissolve in cold water.

PVA having a degree of saponification ranging from 80 to 95 mol % is stable in a neutral pH region, however, when it contacts an alkaline substance, saponification of the remaining ester groups increases and the degree of saponification deviates from the above-mentioned range and exceeds this range. Accordingly, prompt solubility in cold water is lost.

The reason why completely saponified PVA is not immediately soluble in water is because the polymer is crystalline. More specifically, it is believed that because the hydroxyl groups of PVA form very strong hydrogen bonds intermolecularly, then crystallization results and the intrusion of water molecules is inhibited. This is reported by Sakurada et al. in Kobunshi Kagaku, Vol. 12, No. 128, pages 510-513 (1955).

Furthermore, in the report of Sakurada et al. in Kobunshi Kagaku, Vol. 12, No. 128, pages 517-521 (1955), it is taught that the degree of crystallization of completely saponified PVA is increased by heating, and that the increase in the degree of crystallization participates greatly in reducing the solubility.

Moreover, in the report of Sakurada et al., Kobunshi Kagaku, Vol. 12, No. 128, pages 510-513 (1955), it is shown that the crystal region does not participate in the swelling of PVA.

Accordingly, if it is supposed that "dissolution" corresponds to infinite swelling in which molecules of PVA are disjointed, it is necessary to prepare substantially complete amorphous PVA in order to obtain cold water-soluble, completely saponified PVA. In other words, it is necessary that crystallization should be prevented by putting the regularity into disorder.

Given this background, a process for synthesizing atactic PVA while reducing the crystallinity is proposed in Kobunshi Ronbunshu by Imai et al., Vol. 35, No. 12, pages 811-813 (1978) and Japanese Patent Publication No. 36-3999. However, since preparation is possible only under strictly limited conditions in this process, industrial production is considerably difficult.

In order to obtain a PVA having improved properties, an alkoxybutyralization product of PVA is proposed in Japanese Patent Publication No. 38-20720. According to this technique, however, since the chain of the aldehyde used for acetalization is long, and if the degree of acetalization is controlled within a range capable of imparting water solubility, then the acetalization has to be maintained at a low level. Therefore, the disorder of the structural regularity cannot be maintained for a long time, which results in an increase in the degree of crystallization and a decrease in the degree of water solubility.

A technique using acetalized PVA as the water-soluble PVA derivative is disclosed in an example of Japanese Patent Publication No. 39-16910. According to this technique, a non-ionic surface active agent is added to acetoacetalized PVA. Since the average degree of polymerization of acetoacetalized PVA is 550, if commercially available PVA (composed mainly of a syndiotactic polymer) is used, an increase in the degree of crystallization over time cannot be avoided, as in the above-mentioned conventional technique, and therefore, the water solubility is lost. According to the report of Sakurada et al., Kobunshi Kagaku, Vol. 12, No. 128, pages 506-510 (1955) concerning the relationship between the degree of crystallization and the average degree of polymerization of PVA, it is taught that the increase in the average degree of polymerization results in an increase in the degree of crystallization. This means that the increase in the average degree of polymerization results in a reduction in the water solubility.

Furthermore, a technique using partially aldolacetalized PVA is disclosed in Japanese Patent Publication No. 42-2-845. This partially aldolacetalized PVA is prepared by an acetalization reaction between an aldol and PVA. Since both hydroxyl and aldehyde groups are present in a molecule of aldol, a reaction of the molecules of aldol with each other takes place and control of the reaction is difficult. This means that it is very difficult to prepare an acetalization product having a degree of acetalization which assures the maintenance of good water solubility for a long time and is industrially stable.

As is apparent from the foregoing description, a detergent dispenser which comprises a powder detergent and a pouch or bag containing the powder detergent wherein the pouch is made of a cold water-soluble PVA derivative is heretofore unknown. The cold water-soluble PVA derivative is rapidly soluble in cold water, has excellent stability over time, does not undergo any change in crystallinity and has excellent acid resistance and alkali resistance.

SUMMARY OF THE INVENTION

The inventors have made various investigations and have succeeded in providing a cold water-soluble PVA derivative which may be used as a pouch or bag for the instant detergent dispenser. The pouch is promptly soluble in cold water and has excellent long-term stability because of a stable amorphousness. The pouch also has excellent acid resistance and alkali resistance. The detergent of the present invention is any conventional powder detergent. The detergent dispenser is useful, for example, in washing machines where a premeasured amount of powder detergent is contained within the bag so that the user can simply place the pouch containing the powder detergent within the machine without first having to measure the desired amount of detergent.

DETAILED DESCRIPTION OF THE INVENTION

More specifically, it was found that the PVA derivative of the instant pouch has a basic structure comprising vinyl alcohol units, vinyl acetate units and acetalized vinyl alcohol units, wherein the viscosity average degree of polymerization based on the vinyl monomer units is 200 to 500, the content of the vinyl alcohol units is 70 to 90 mol %, the content of the vinyl acetate units is 0 to 2 mol %, and the degree of acetalization is 10 to 30 mol %. The acetalized vinyl alcohol units are represented by the following formula:

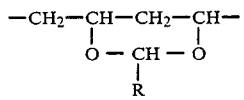

wherein R represents an alkyl group.

The average alkyl chain length of R corresponds to a carbon number of 0.34 to 1.70. The pouch is soluble in cold water and does not demonstrate an increase in the degree of crystallization because it has a stable amorphorousness. The pouch has excellent long term stability and is resistant to acid and alkali. A predetermined amount of a powder detergent is placed into the pouch.

The pouch made from the cold water-soluble polyvinyl alcohol derivative according to the invention comprises 70 to 90 mol % of the vinyl alcohol units, 0 to 2 mol % of the vinyl acetate units and 10 to 30 mol % of the acetalized vinyl alcohol units having the formula:

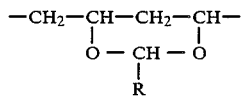

in which R is an alkyl group having 0.34 to 1.70 carbon atoms on the average. The vinyl monomer units have a viscosity-average polymerization degree of 200 to 500.

It is preferable that the compound has a methyl group for R. It is possible that the acetalized vinyl alcohol units of the compound have two or more alkyl groups in R.

The mechanism of imparting the water solubility to the cold water soluble PVA derivative and the reason why this PVA has a stable amorphousness will now be described.

The reason why completely saponified PVA is not immediately soluble in cold water has been described hereinbefore. In contrast, partially saponified PVA having a degree of saponification of 80 to 95 mol % is water soluble. The reason is that acetate groups are present in the molecule. The acetate group per se is a hydrophobic group. However, if the acetate groups are present in an amount of 5 to 20 mol % in the molecule, these groups exert a steric hinderance, thereby disturbing the intermolecular arrangement of chains. Thus, crystallization among molecules of PVA is prevented. Accordingly, a partially saponified PVA may be water soluble. However, since partially saponified PVA has ester linkages, as pointed out hereinbefore, saponification is increased upon contact with an alkali. Thus, the PVA may no longer be water-soluble and attainment of an alkali resistance cannot be expected.

In the present invention, a mixture of aldehydes (R'-CHO) is added by acetalization to completely saponified PVA having a viscosity average degree of polymerization based on the vinyl monomer units (hereinafter referred to merely as "viscosity-average degree of polymerization") of 200 to 500 so that the average alkyl chain length of R corresponds to a carbon number of 0.34 to 1.70. In this PVA derivative, the degree of acetalization is 10 to 30 mol %. This acetalized portion exerts a steric hindrance which disturbs the intramolecular regularity of PVA and inhibits crystallization. Accordingly, the cold water-soluble PVA derivative of the present invention is amorphous and has weak intramolecular bonding forces. Accordingly, it is considered that when this PVA derivative is placed into water, the water easily intrudes in the texture and the derivative is water soluble.

The basic structure of the cold water-soluble PVA derivative of the present invention is represented by the following formula:

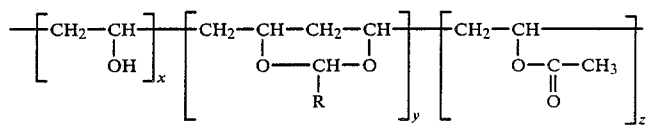

and the derivative has several ether linkages in the molecule.

This bonding state is stable against alkali, and the water solubility is not lost even in the presence of alkali.

The reasons why the average degree of polymerization of PVA used in the present invention, the alkyl chain length of the aldehyde used, and the degree of acetalization are limited as described above in the present invention will now be described.

The partially acetalized PVA used in the present invention is prepared from commercially available PVA, which is composed mainly of a syndiotactic polymer and has a high crystallinity.

The reason why the viscosity-average degree of polymerization is limited to 200 to 500 in the present invention is due to the relation between the degree of polymerization and the degree of crystallization. This relation is reported by Sakurada et al in Kobunshi Kogaku, Vol. 12, No. 128, pages 506–510 (1955), which teaches that an increase in the degree of polymerization has a great influence on the degree of crystallization.

As a result of various experiments made by the inventors, it was found that it is necessary that PVA having a viscosity-average degree of polymerization of 200 to 500 should be used. In the case of PVA having an average degree of polymerization higher than 500, the cold water solubility is degraded over time and good results cannot be obtained.

The reason for the limitation of the alkyl chain length of the aldehyde to be added is due to the effect of steric hindrance. If the alkyl chain length R corresponds to a carbon number smaller than 0.32, the alkyl chain length is too short and no effect of steric hindrance can be attained. If the alkyl chain length R corresponds to a carbon number larger than 1.72, the alkyl chain length is larger than that of the aldehyde used in the present invention, and PVA becomes more oleophilic. If acetalization is effected to a degree of acetalization of 10 to 30 mol % as specified in the present invention, PVA becomes water insoluble. Accordingly, in order to maintain PVA in the water-soluble region, the number of moles of the aldehyde which is added should be reduced, resulting in a reduction of the effect of steric hindrance. Therefore, as-prepared PVA is water-soluble, but if PVA is allowed to stand still for a long time, the degree of crystallization is increased and the solubility in cold water is reduced.

The reason for the limitation of the degree of acetalization in the present invention is that in order to maintain the cold water solubility for a long period of time, it is necessary that the degree of crystallization should not be changed after preparation. More specifically, if the degree of acetalization exceeds 30 mol %, the PVA becomes insoluble in water. If the degree of acetalization is lower than 10 mol %, the PVA temporarily has cold water solubility, however, the degree of crystallization is changed over time and the cold water solubility is reduced.

As is apparent from the foregoing description, according to the present invention, by limiting the average degree of polymerization of the starting PVA, by limiting the alkyl chain length of the aldehyde to be added and by limiting the degree of acetalization within specific ranges, an intended cold water-soluble PVA derivative having excellent stability can be obtained. Incidentally, a single aldehyde or a mixture of two or more of aldehydes may be used for the production of the cold water-soluble PVA derivative of the present invention.

The cold water-soluble PVA derivative of the present invention can be easily prepared from commercially available PVA by a known acetalization process. Since no special means need be adopted for the synthesis of PVA, the present invention is industrially excellent. For example, for molding or for formation of a film, there may be adoped a melt extrusion process and a casting process. Furthermore, known plasticizers and other additives for PVA may be incorporated. Moreover, known secondary processing may be adopted.

The PVA compound is obtained by a conventional method for acetalization. A polyvinyl alcohol is reacted with an aldehyde having the formula R-CHO in which R is an alkyl having 0.34 to 1.70 on the average.

The process practically comprises the steps of adding to water a polyvinyl alcohol having a viscosity-average polymerization degree of 200 to 500, heating the mixture to form an aqueous solution, adding to the solution an acid, reacting an aldehyde having the formula R-CHO, in which R is an alkyl having 0.34 to 1.70 carbon atoms on the average, with the solution to conduct acetalization, then neutralizing the product mixture and separating the compound by drying and removal of water or by the use of an organic solvent. The aqueous solution of said polyvinyl alcohol may be alternatively formed by first adding an acid and by then adding the polyvinyl alcohol to water.

As is apparent from the foregoing description, the cold water-soluble PVA derivative of the present invention can be promptly dissolved in cold water and has a stable amorphousness. Therefore, the PVA derivative is excellent for long-term stability and has a good resistance to acid and alkali. moreover, since the melting point is low, the PVA derivative may be molded by melt extrusion and injection molding or molded into fibers, and the PVA derivative may be widely used in various fields.

The PVA derivative can be applied to an absorbent article such as a sanitary article together with a superabsorptive polymer. It can also be used in the form of a film.

It is useful as a hotmelt adhesive. It may be used in combination of up to 60 percent by weight of a polyhydric alcohol compound having a melting point of 70° C. or lower.

It is useful as an envelope to wrap an article.

It can be used in the form of fibers by spinning.

It may contain up to 90 percent by weight of water insoluble fibers and be used in the form of a sheet.

It may be used in the form of a molded article.

A film of the compound may be used together with an oily substance and/or a nonionic surfactant as a releasing agent. A coating or blend may be conducted for the purpose.

In this way the PVA derivative is useful in various fields by utilizing the above shown physical properties.

More specifically, the cold water soluble polyvinyl alcohol derivative of the invention is formed into the shape of a pouch or bag in order to hold a desired amount of a powder detergent.

Any type of conventional powder detergent may be used in the instant invention. For instance a preferable detergent is disclosed in Japanese Patent Application No. 61-57699. A super-concentrated granular detergent may be prepared by, for example, a process wherein a powdery surfactant is dry-blended with a detergent builder (see Japanese Patent Laid-Open No. 36508/1978), a process wherein a slurry containing a high concentration of a surfactant is dried and then granulated (see Japanese Patent Laid-Open No. 61511/1973), or a process wherein an aqueous slurry of an inorganic composition is prepared and spray-dried to obtain beads of a detergent builder and a liquid nonionic surfactant is occluded into the beads (see Japanese Patent Laid-Open No. 43710/ 1978). Japanese Patent Application No. 61-57699 and Japanese Patent Laid-Open Nos. 36508/1978, 61511/1973 and 43710/1978 are herein incorporated by reference.

The super-concentrated granular detergent is freely flowable and has a bulk density of at least 0.5 g/cm$^3$. The standard usage in each washing operation is preferably 30 g or less for 30 liters of water.

The inventors have found that a powdery detergent most suitable for the present invention has a high bulk density and comprises grains in which the particles of an inorganic component are dispersed in a continuous phase comprising a part or the whole of an organic component constituting the detergent composition. The organic component is an anionic surfactant, the inorganic component is a powdery alkali and the weight ratio of the organic component to the inorganic component is $\frac{1}{8}$ to 3/1.

The detergent can be prepared, for example, by mixing an organic component comprising a nonneutralized anionic surfactant as an indispensable component with an inorganic component comprising a powdery alkali as an indispensable component in the presence of, if necessary, a small amount of water to form a massive mixture. The inorganic component is dispersed in a continuous phase of the neutralized anionic surfactant and the mass is pulverized into particles having a diameter of preferably 40 to 2,0000 μm and more preferably from 125 to 1,500 μm. A part of the final detergent component can be mixed into the massive mixture either in the pulverization step or thereafter. In this case, the amount of the massive mixture is at least 30%, preferably at least 50%, based on the final detergent composition.

Examples of the anionic surfactants contained as an indispensable component in the organic component of the detergent include alkylbenzenesulfonates, polyoxyalkylene alkyl or alkenyl ether sulfates, alkyl or alkenyl sulfates, olefinsulfonates, alkanesulfonates, saturated or unsaturated carboxylates, polyoxyalkylene alkyl or alkenyl ether carboxylates, α-sulfo fatty acid salts or esters, amino acid-type surfactants and acyalmino acid-type surfactants. The amount of the anionic surfactant is preferably at least 80% based on the organic components.

Examples of the organic components which are added, if necessary, together with the anionic surfactant to form the continuous phase as described above include polyoxyalkylene alkyl or alkenyl ethers, higher fatty acid alkanolamides, sucrose fatty acid esters, fatty acid glycerol monoesters, alkylamine oxides, carbo- or sulfobetaine-type surfactants and phosphoric ester surfactants. The amount of these organic components is 10 to 75%, preferably 15 to 60%, based on the detergent composition.

The inorganic components dispersed as an indispensable component in the organic component constituting the continuous phase of the powdery detergent are powdery alkali such as sodium carbonate, sodium sesquicarbonate and sodium silicate. Further, neutral salts such as Glauber's salt; phosphates such as orthophosphates, pyrophosphates and tripolyphosphates; and alumino-silicates can be contained therein. The amount of the inorganic components is 10 to 75%, preferably 15 to 60%, based on the detergent.

The powdery detergent may further contain ordinary cationic surfactants, divalent sequestering agents, antiredeposition agents, bleaching agents, enzymes, bluing agents, anti-caking agents, antioxidants, fluorescent dyes, fluorescent brighteners, flavors, etc.

The present invention will now be described in detail with reference to the following examples that by no means limit the scope of the invention.

EXAMPLE 1

Twenty grams of a polyvinyl alcohol having a saponification degree of 98.6 mol % and a viscosity-average polymerization degree of 200 was added to 950 g of water and the mixture was stirred with heat to form an aqueous solution. To one (1) kg of the solution having a solid concentration of 2% by weight was added 0.7 g of concentrated hydrochloric acid, and 3 g of acetaldehyde was added to the solution. The mixture was reacted at 60° C. for 5 hours with stirring. Then, neutralization was effected with NaOH, and the reaction product was precipitated by the addition of acetone. The precipitate was separated, washed with acetone and dried to obtain partially acetoacetalized PVA. The degree of acetoacetalization of the reaction product was measured by an acetoacetalization degree determining method contrived by modifying the formalization degree determining method disclosed in Kobunshi Bunseki Handbook (published by Asakura Shoten, page 770) based on the difference in the molecular weight between formaldehyde and acetaldehyde. It was found that the degree of acetoacetalization was 22.2 mol %. An aqueous solution of the obtained product was prepared, cast onto a glass sheet, dried and heated at 95° C. to obtain a film having a thickness of 20 microns.

EXAMPLE 2

20 g of a polyvinyl alcohol having a saponification degree of 98.4 mol % and a viscosity-average polymerization degree of 400 was added to 980 g of water and the mixture was stirred with heat to form an aqueous solution of the polyvinyl alcohol. To 1 kg of the solution having a solid concentration of 2% by weight was added 0.7 g of concentrated hydrochloric acid, and 2.5 g of acetaldehyde was added to the solution. Partially acetoacetalized PVA was obtained in the same manner as described in Example 1. The degree of acetoacetalization of the reaction product was 17.0 mol % (as determined according to the method described in Example 1). A film having a thickness of 20 microns was obtained according to the same procedures as described in Example 1.

EXAMPLE 3

20 g of a polyvinyl alcohol having a saponification degree of 98.6 mol % and a viscosity-average polymerization degree of 500 was added to 980 g of water and the mixture was stirred with heat to form an aqueous solution of polyvinyl alcohol. To 1 kg of the solution having a solid concentration of 2% by weight was added 0.7 g of concentrated hydrochloric acid, and 3.6 g of acetaldehyd e was added to the solution. Partially acetoacetalized PVA was obtained according to the same procedures as described in Example 1. The degree of acetoacetalization of the obtained reaction product was 30.0 mol % (as determined according to the same method as described in Example 1). A film having a thickness of 20 microns was obtained according to the same procedures as described in Example 1.

EXAMPLE 4

To 1 kg of the same aqueous solution of PVA as in Example 3 was added 0.7 g of concentrated hydrochloric acid, and 2.4 g of paraldehyde was added to the aqueous solution. Partially acetoacetalized PVA was obtained according to the same procedures as described in Example 1. The degree of acetoacetalization of the reaction product was 22.2 mol % (as determined according to the same method as described in Example 1). A film having a thickness of 20 microns was obtained according to the same procedures as described in Example 1.

EXAMPLE 5

To 1 kg of the same aqueous solution of PVA as in Example 3 was added 0.7 g of hydrochloric acid, and 1.4 g of acetaldehyde was added to the solution. Partially acetoacetalized PVA was obtained according to the same procedures as described in Example 1. The degree of acetoacetalization of the reaction product was 10.3 mol % (as determined according to the same method as described in Example 1). A film having a thickness of 20 microns was obtained according to the same procedures as described in Example 1.

EXAMPLE 6

To 1 kg of the same aqueous solution of PVA as in Example 3 was added 0.7 g of concentrated hydrochloric acid, and 3.0 g of an aldehyde mixture (formaldehyde/acetaldehyde, molar ratio of 65/35) was added to the solution. Mixed acetalized PVA was obtained according to the same procedures a described in Example 1. From the result of gas chromatography, it was found that the average alkyl chain length of the acetalized portion of the reaction product was 0.34. When the degree of acetalization was determined from the average alkyl chain length while making a correction based on the molecular weight, it was found that the degree of acetalization was 17 mol %. A film having a thickness of 20 microns was obtained according to the same procedures as described in Example 1.

EXAMPLE 7

To 1 kg of the same aqueous solution of PVA as in Example 3 was added 0.7 g of concentrated hydrochloric acid, and 2.5 g of an aldehyde mixture (acetaldehyde/n-butylaldehyde, molar ratio of 65/35) was added to the solution. Mixed acetalized PVA was obtained according to the same procedures as described in Example 1. The average alkyl chain length of the acetalized portion of the reaction product was 1.70 as determined by gas-chromatographic analysis. The degree of acetalization was 13.6 mol % as determined in the same manner as described in Example 1 after making a correction based on the molecular weight from the average alkyl chain length. A film having a thickness of 20 microns was obtained according to the same procedures as described in Example 1.

EXAMPLE 8

To 1 kg of the same aqueous solution of PVA as in Example 3 was added 0.7 g of concentrated hydrochloric acid, and 1.2 g of paraformaldehyde was added to the aqueous solution. The mixture was reacted for 1 hour. Then, 1.8 g of paraldehyde was added and the mixed acetalized PVA was obtained according to the same procedures as described in Example 1. The average alkyl chain length of the acetalized portion of the reaction product was 0.53 as determined by gas-chromatographic analysis. The degree of acetalization was 15.3 mol % as determined according to the same method as described in Example 1 after making a correction based on the molecular weight from the average alkyl chain length. A film having a thickness of 20 microns was prepared according to the same procedures as described in Example 1.

EXAMPLE 9

To 1 kg of the same aqueous solution of PVA as in Example 3 was added 0.7 g of concentrated hydrochloric acid, and 2.5 g of an aldehyde mixture (acetaldehyde/n-butylaldehyde, molar ratio of 90/10) was added to the solution. Mixed acetalized PVA was obtained according to the same procedures as described in Example 1. The average alkyl chain length of the acetalized portion of the reaction product was 1.27 as determined by the gas-chromatographic analysis. The degree of acetalization was 16.8 mol % as determined according to the same method as described in Example 1 after making a correction based on the molecular weight from the average alkyl chain length. A film having a thickness of 20 microns was obtained according to the same procedures as described in Example 1.

COMPARATIVE EXAMPLE 1

An aqueous solution of PVA (having a degree of saponification of 98.4 mol % and a viscosity-average degree of polymerization of 500) was prepared and glycerol was added to the aqueous solution in an amount of 10% by weight based on PVA. A film having a thickness of 20 microns was obtained according to the same procedures as described in Example 1.

COMPARATIVE EXAMPLE 2

To 1 kg of the same aqueous solution of PVA as in Example 3 was added 0.7 g of concentrated hydrochloric acid, and 5.0 g of formaldehyde (37% aqueous solution) was added to the aqueous solution. Partially formalized PVA was obtained according to the same procedures as described in Example 1. The degree of formalization of the reaction product was 14.1 mol % (according to the formalization degree measuring method described on page 770 of Kobunshi Bunseki Handbook). A film having a thickness of 20 microns was obtained according to the same procedures as described in Example 1.

COMPARATIVE EXAMPLE 3

To 1 kg of the same aqueous solution of PVA as described in Example 3 was added 0.7 g of concentrated hydrochloric acid, and 1.3 g of n-butylaldehyde was added to the aqueous solution. Partially butyralized PVA was obtained according to the same procedures as described in Example 1. The degree of butyralization of the reaction product was 8.4 mol % (as determined by the measuring method contrived by modifying the above-mentioned method for determination of the degree of butyralization based on the molecular weight). A film having a thickness of 20 microns was obtained according to the same procedures as described in Example 1.

COMPARATIVE EXAMPLE 4

To 1 kg of the same aqueous solution of PVA as in Example 3 was added 0.7 g of concentrated hydrochloric acid, and 1.0 g of acetaldehyde was added to the aqueous solution. Partially acetoacetalized PVA was obtained according to the same procedures as described in Example 1. The degree of acetalization of the reaction product was 8.7 mol % (as determined by the same method as described in Example 1). A film having a thickness of 20 microns was obtained according to the same procedures as described in Example 1.

COMPARATIVE EXAMPLE 5

To 1 kg of the same aqueous solution of PVA as described in Example 3 was added 0.7 g of concentrated hydrochloric acid, and 4.0 g of acetaldehyde was added to the aqueous solution. Partially acetoacetalized PVA was obtained according to the same procedures as described in Example 1. The degree of acetalization was 34.0 mol % (as determined according to the same method as described in Example 1). Considerable quantities of insoluble substances were formed in the reaction product on completion of the reaction. A film having a thickness of 20 microns was obtained according to the same procedures as described in Example 1.

COMPARATIVE EXAMPLE 6

To 1 kg of an aqueous solution of PVA (having a degree of saponification of 98.0 mol % and a viscosity-average degree of polymerization of 550) having a solid concentration of 2% by weight was added 0.7 g of concentrated hydrochloric acid, and 2.0 g of acetaldehyde was added to the same aqueous solution. Partially acetoacetalized PVA was obtained according to the same procedures as described in Example 1. The degree of acetalization of the reaction product was 14.6 mol % (as determined according to the same method as described in Example 1). A film having a thickness of 20 microns was obtained according to the same procedures as described in Example 1.

COMPARATIVE EXAMPLE 7

To 1 kg of an aqueous solution of PVA (having a degree of saponification of 98.3 mol % and a viscosity-average degree of polymerization of 970) having a solid concentration of 2% by weight was added 0.7 g of concentrated hydrochloric acid, and 2.6 g of acetaldehyde was added to the aqueous solution. Partially acetoacetalized PVA was obtained according to the same procedures as described in Example 1. The degree of acetalization of the reaction product was 17.6 mol % (as determined according to the same method as described in Example 1).

A film having a thickness of 20 microns was obtained according to the same procedures as described in Example 1.

COMPARATIVE EXAMPLE 8

To 1 kg of an aqueous solution of PVA (having a degree of saponification of 98.7 mol % and a viscosity-average degree of polymerization of 1760) having a solid concentration of 2% by weight was added 0.7 g of concentrated hydrochloric acid, and 2.6 g of acetaldehyde was added to the aqueous solution. Partially acetoacetalized PVA was obtained according to the same procedures as described in Example 1. The degree of acetalization of the reaction product was 18.0 mol % (as determined according to the same method as described in Example 1). A film having a thickness of 20 microns was obtained according to the same procedure as described in Example 1.

COMPARATIVE EXAMPLE 9

To 1 kg of the same aqueous solution of PVA as described in Example 1 was added 0.7 g of concentrated hydrochloric acid, and 3.0 g of an aldehyde mixture (formaldehyde/acetaldehyde, molar ratio of 70/30) was added thereto. Mixed acetalized PVA was obtained according to the same procedures as described in Example 1. The average alkyl chain length of the acetalized portion of the obtained reaction product was 0.32 as determined by gas-chromatographic analysis. The degree of acetalization was 16.2 mol % as determined by the measuring method described in Example 1 after making a correction based on the molecular weight from the average alkyl chain length. A film having a thickness of 20 microns was obtained according to the same procedures as described in Example 1.

COMPARATIVE EXAMPLE 10

To 1 kg of the same aqueous solution of PVA as described in Example 3 was added 0.7 g of concentrated hydrochloric acid, and 1.5 g of an aldehyde mixture (acetaldehyde/n-butyraldehyde, molar ratio of 64/36) was added to the aqueous solution. Mixed acetalized PVA was obtained according to the same procedures as described in Example 1. Considerable quantities of insoluble substances were observed in the reaction product on completion of the reaction. The average alkyl chain length of the acetalized portion of the reaction product was 1.72 as determined by the gas-chromatographic analysis. The degree of acetalization was 10.2 mol % as determined according to the same method as described in Example 1 after making a correction based on the molecular weight from the average alkyl chain length. A film having a thickness of 20 microns was obtained according to the same procedures as described in Example 1.

Results of the analysis of samples prepared in Examples 1 through 9 and Comparative Examples 1 through 10 are shown in Table 1. Incidentally, the average degree of polymerization of the starting PVA is a viscosity-average degree of polymerization determined according to the measuring method of JIS K-6726-1977.

With respect to each sample, the water solubility, the long-period stability, the heat resistance, the acid resistance, the alkali resistance, the heat sealing property, the specific gravity, the thermal properties and the turbidity of a dimethylsulfoxide solution containing 40% of water were determined and evaluated.

The test methods are described below, and the evaluation results are shown in Tables 2 through 5.

Test Methods

1. Water Solubility

A piece of film was cut into a size of 2 cm × 2 cm and dropped into water maintained at 10° C. The dissolution time in the standing state was then measured.

2. Long-Period Stability

A piece of film was cut into a size of 2 cm × 2 cm and allowed to stand at a temperature of 50° or 40° C. at a relative humidity of 80% for 30 days. The dissolution time was measured according to the above-mentioned method.

3. Heat Resistance

A piece of film was cut into a size of 2 cm × 2 cm and heated in an air oven at 140° C. for 1 hour. The film was then cooled and the dissolution time was measured according to the above-mentioned method.

4. Acid Resistance

To 30 g of a powdery pulp was added 70 g of a dilute hydrochloric acid solution having a pH value of 2, and a uniform flaky product was prepared. A piece of film cut into a size of 2 cm × 2 cm was thrown into the flaky product so that both the surfaces of the film were completely brought into contact with the flaky product, and in this state, the film was allowed to stand at a temperature of 40° C. and at a relative humidity of 80% for 20 days. The film was recovered and the dissolution time was measured according to the above-mentioned method.

Separately, a sample was dissolved in the above-mentioned dilute hydrochloric acid solution at a concentration of 5% and the sample was allowed to stand in this state at 40° C. for 20 days. Then, neutralization was effected with an aqueous solution of sodium hydroxide, and the precipitate was separated by acetone, washed and dried. The degree of acetalization was measured according to the above-mentioned method.

5. Alkali Resistance

To 80 g of anhydrous sodium carbonate was added 20 g of water and a homogeneous powder was prepared. A film cut into a size of 2 cm x 2 cm was through into the powder so that both the surfaces of the film were completely brought into contact with the powder. In this state, the film was allowed to stand at a temperature of 40° C. and at a relative humidity of 80% for 20 days. The film was recovered and the dissolution time was measured according to the above-mentioned method.

Separately, 3 g of a sample was dissolved in 300 ml of a N/10 aqueous solution of sodium hydroxide and allowed to stand at 40° C. for 10 days. The acetalized product was separated by acetone, washed with acetone and dried. The degree of acetalization was measured according to the above-mentioned method.

6. Change of Specific Gravity

A sample was placed under the same standing conditions as adopted in the methods for testing the long-period stability and heat resistance, and changes in the specific gravity were traced. This test was conducted based on the report of Sakurada et al (Kobunshi Kagaku, Vol. 12, No. 128, pages 50 (1955)) indicating that there is an interrelation between an increase in the crystallinity and rise of the specific gravity. A sample which showed a rise of the specific gravity under the above standing conditions has a tendency of reduction in water solubility.

In the experiment, the size of the film was adjusted to 1 cm × 1 cm and the film was allowed to stand at a temperature of 25° C. and at a relative humidity of 40% for 24 hours, before the measurement was conducted. A carbon tetrachloride/benzene mixed solvet was used as the solvent, and the film was allowed to stand in the solvent for 10 minutes after standing. The specific gravity of the solvent where no migration of the film occurred was designated as the specific gravity of the film.

7. Thermal Properties

The melting point and decomposition-initiating temperature were measured by using the test devices described below.

(1) Melting Point

The melting point was measured by using a melting point measuring device, Model MP-S3 supplied by Yanagimoto Seisakusho.

(2) Decomposition-Initiating Temperature

The decomposition-initiating temperature was measured by using a thermobalance, Model DT-30 supplied by Shimadzu Seisakusho.

8. Heat Sealing Property

A sample was bonded at 140° C. for 1 second by a heat sealer, and the bonded state was checked.

9. Stability of Dimethyl Sulfoxide Solution Containing 40% of Water

In 40 g of deionized water was dissolved 3 g of a sample and the solution was then cooled. 60 g of dimethyl sulfoxide was added to the solution. After it was confirmed that the solution was transparent, the solution was filtered through filter paper No. 1 and allowed to stand at 30° C. The transmittance was periodically measured with a spectrophotometer (Model 100-40 supplied by Hitachi) by using rays having a wavelength of 430 m$\mu$. Then, the absorbance, $D = \log(1/T)$, was determined and plotted against the standing time, and the time $t\frac{1}{2}$ required for D to reach $\frac{1}{2}$ of the equilibrium value De was determined. This time was designated as the turbidity time.

This experiment was carried out for confirming the regularity of PVA. The occurrence of turbidity or gelation is a criterion indicating disorder of the steric regularity.

This experiment was conducted in light of the report of Imai et al, Kobunshi Kagaku, Vol. 12, No. 172, pages 499 through 504.

TABLE 1

| | Viscosity Degree of Average Polymerization of Starting PVA | Vinyl Alcohol (mol. %) | Vinyl Acetal Aldehyde | Average Alkyl Chain Length R | Degree of Acetalization (mol. %) | Vinyl Acetate (mol. %) |
|---|---|---|---|---|---|---|
| Examples | | | | | | |
| 1 | 200 | 76.8 | Acetaldehyde | 1.00 | 22.2 | 1.0 |
| 2 | 400 | 81.8 | " | " | 17.0 | 1.2 |
| 3 | 500 | 68.7 | " | " | 30.0 | 1.3 |
| 4 | 500 | 76.7 | Paraldehyde | " | 22.2 | 1.1 |
| 5 | 500 | 88.7 | Acetaldehyde | " | 10.3 | 1.0 |
| 6 | 500 | 81.6 | Formaldehyde and Acetaldehyde | 0.34 | 17.4 | 1.0 |
| 7 | 500 | 85.3 | Acetaldehyde and n-butylaldehyde | 1.70 | 13.6 | 1.1 |
| 8 | 500 | 83.3 | Paraformaldehyde and paraldehyde | 0.53 | 15.3 | 0.9 |
| 9 | 500 | 82.0 | Acetaldehyde and n-butylaldehyde | 1.27 | 16.8 | 1.2 |
| Comparative Examples | | | | | | |
| 1 | 500 | 98.4 | — | — | — | 1.6 |
| 2 | 500 | 85.2 | Formaldehyde | 0.00 | 14.1 | 0.7 |
| 3 | 500 | 90.5 | n-butylaldehyde | 3.00 | 8.4 | 1.1 |
| 4 | 500 | 90.0 | Acetaldehyde | 1.00 | 8.7 | 1.3 |
| 5 | 500 | 65.0 | " | 1.00 | 34.0 | 1.0 |
| 6 | 550 | 84.2 | " | 1.00 | 14.6 | 1.2 |
| 7 | 970 | 81.4 | " | 1.00 | 17.6 | 1.0 |
| 8 | 1760 | 80.8 | " | 1.00 | 18.0 | 1.2 |
| 9 | 500 | 82.6 | Formaldehyde and Acetaldehyde | 0.32 | 16.2 | 1.2 |
| 10 | 500 | 88.5 | Acetaldehyde and n-butylaldehyde | 1.72 | 10.2 | 1.3 |

TABLE 2

| Evaluation Items | | Conditions | Examples 1 | 2 | 3 | 4 | 5 | 6 | 7 | 8 | 9 | Comparative Examples 1 | 2 | 3 | 4 |
|---|---|---|---|---|---|---|---|---|---|---|---|---|---|---|---|
| Water Solubility, 10° C., City Water | | untreated | 35–42 | 30–43 | 37–46 | 35–41 | 33–38 | 32–49 | 36–47 | 35–44 | 37–43 | insoluble | insoluble | 31–44 | 37–46 |
| Long-Period Stability (Water Solubility) | | 50° C., 30 days | 36–46 | 34–40 | 38–49 | 37–47 | 35–46 | 33–47 | 36–44 | 33–42 | 31–44 | | | insoluble | insoluble |
| | | 40° C., RH 80%, 30 days | 33–40 | 35–43 | 36–44 | 34–41 | 36–47 | 31–43 | 32–42 | 35–43 | 36–47 | | | insoluble | insoluble |
| Heat Resistance (Water Solubility) | | 140° C., 1 hour | 38–42 | 37–39 | 33–42 | 34–43 | 35–46 | 38–44 | 33–42 | 31–40 | 37–46 | | | insoluble | insoluble |
| Acid Resistance | Water Solubility | pH - 2, 40° C., 20 days | 30–38 | 33–42 | 32–45 | 33–42 | 35–41 | 36–47 | 37–46 | 33–42 | 37–44 | | | | |
| | Acetalization degree (mol. %) | Untreated | 22.2 | 17.0 | 30.0 | 22.2 | 10.3 | 17.1 | 18.6 | 15.3 | 16.8 | | | | |
| | | ph - 2, 40° C., 20 days | 22.6 | 17.3 | 29.7 | 21.6 | 10.7 | 16.8 | 18.1 | 15.0 | 16.2 | | | | |
| Alkali Resistance | Water Solubility | in H$_2$CO$_3$ 40° C., 20 days | 32–39 | 29–36 | 30–41 | 36–40 | 35–41 | 31–48 | 36–44 | 30–40 | 31–43 | | | | |
| | Acetalization degree (mol. %) | Untreated | 22.2 | 17.0 | 30.0 | 22.2 | 10.3 | 17.1 | 18.6 | 15.3 | 16.8 | | | | |
| | | In aqueous NaOH solution 40° C., 10 days | 21.7 | 17.3 | 30.4 | 22.6 | 10.0 | 17.1 | 18.6 | 15.9 | 16.2 | | | | |
| Heat Sealing Property | | 140° C., 1 second | * | * | * | * | * | * | * | * | * | * | * | * | * |

| Evaluation Items | | | Comparative Examples 5 | 6 | 7 | 8 | 9 | 10 |
|---|---|---|---|---|---|---|---|---|
| Water Solubility, 10° C., City Water | | | large quantities of insoluble substances | 33–49 | 34–51 | 41–53 | 33–44 | large quantities of insoluble substances |
| Long-Period Stability (Water Solubility) | | | | insoluble insoluble | insoluble insoluble | insoluble insoluble | insoluble insoluble | |
| Heat Resistance (Water Solubility) | | | | insoluble | insoluble | insoluble | insoluble | |
| Acid Resistance | Water Solubility | | | | | | | |
| | Acetalization degree (mol. %) | | | | | | | |
| Alkali Resistance | Water Solubility | | | | | | | |
| | Acetalization degree (mol. %) | | | | | | | |
| Heat Sealing Property | | | * | * | * | * | * | * |

*observed

TABLE 3

| | Specific Gravity | | | |
|---|---|---|---|---|
| | Untreated | 50° C., 30 Days | 40° C. RH 80%, 30 Days | 140° C. 1 Hour |
| Examples | | | | |
| 1 | 1.2700 | 1.2700 | 1.2700 | 1.2700 |
| 2 | 1.2700 | 1.2700 | 1.2700 | 1.2700 |
| 3 | 1.2700 | 1.2700 | 1.2700 | 1.2700 |
| 4 | 1.2700 | 1.2700 | 1.2700 | 1.2700 |
| 5 | 1.2700 | 1.2700 | 1.2700 | 1.2700 |
| 6 | 1.2700 | 1.2700 | 1.2700 | 1.2700 |
| 7 | 1.2700 | 1.2700 | 1.2700 | 1.2700 |
| 8 | 1.2700 | 1.2700 | 1.2700 | 1.2700 |
| 9 | 1.2700 | 1.2700 | 1.2700 | 1.2700 |
| Comparative Examples | | | | |
| 1 | 1.3061 | | | 1.3076 |
| 2 | 1.2925 | | | |
| 3 | 1.2700 | 1.2720 | 1.2720 | 1.2755 |
| 4 | 1.2700 | 1.2733 | 1.2733 | 1.2775 |
| 5 | 1.2700 | | | |
| 6 | 1.2700 | 1.2733 | 1.2733 | 1.2775 |
| 7 | 1.2700 | 1.2733 | 1.2733 | 1.2775 |
| 8 | 1.2700 | 1.2745 | 1.2745 | 1.2775 |
| 9 | 1.2700 | 1.2775 | 1.2775 | 1.2790 |
| 10 | 1.2700 | | | |

TABLE 4

| | Thermal Properties | |
|---|---|---|
| | Melting Point (°C.) | Thermal Decomposition-Initiating Temperature (°C.) |
| Examples | | |
| 1 | 157 | 242 |
| 2 | 162 | 245 |
| 3 | 161 | 240 |
| 4 | 167 | 243 |
| 5 | 183 | 244 |
| 6 | 164 | 244 |
| 7 | 161 | 242 |
| 8 | 163 | 244 |
| 9 | 157 | 241 |
| Comparative Example 2 | 210 | 235 |

TABLE 5

| | Turbidity Time $t\frac{1}{2}$ (hours) | Change of State | | | |
|---|---|---|---|---|---|
| | | 30 hours | 53 hours | 95 hours | 200 hours |
| Starting PVA of Example 1 | 26.5 | slightly turbid | white turbidity | gelation | |
| Starting PVA of Example 2 | 47.5 | slightly turbid | white turbidity | white turbidity | gelation |
| Starting PVA of Example 3 | 26.5 | slightly turbid | white turbidity | gelation | |
| Examples | | | | | |
| 1 | very long | transparent | transparent | transparent | transparent |
| 2 | very long | transparent | transparent | transparent | transparent |
| 3 | very long | transparent | transparent | transparent | transparent |
| 4 | very long | transparent | transparent | transparent | transparent |
| 5 | very long | transparent | transparent | transparent | transparent |
| 6 | very long | transparent | transparent | transparent | transparent |
| 7 | very long | transparent | transparent | transparent | transparent |
| 8 | very long | transparent | transparent | transparent | transparent |
| 9 | very long | transparent | transparent | transparent | transparent |

EXAMPLE 10

A uniform mixture of 420 g of water and 420 g of a polyvinyl alcohol having a saponification degree of 98.6 mol % and a viscosity-average polymerization degree of 200 was prepared and stirred at 98° C. to form an aqueous solution of the polyvinyl alcohol. The solution was cooled to 85° C. and mixed with 12 g of a concentrated hydrochloric acid. Then, 43 g of paraaldehyde was added to the solution and the reaction was effected with agitation at 80° C. for 6 hours. Neutralization with NaOH was carried out. Film having a thickness of 20 microns was formed from the product mixture with a table coater. The product was found to have an acetoacetalization degree of 19.9 mol %, according to the method as shown in Example 1.

EXAMPLE 11

A uniform mixture was prepared from 220 g of water and 94 g of the polyvinyl alcohol used in Example 3 and stirred at 85° C. to form an aqueous solution. The solution was cooled to 80° C. and mixed with 2.7 g of a concentrated hydrochloric acid. Then, 9.7 g of paraaldehyde was added thereto and the reaction was effected at 80° C. for 6 hours, while stirring. Neutralization with NaOH was carried out. Film 20 microns thick was obtained from the product mixture with a table coater. The product had an acetoacetalization degree of 23.0 mol %, according to the method as shown in Example 1.

EXAMPLE 12

94 g of the polyvinyl alcohol used in Example 3 was added to 220 g of water in which 2.0 g of a concentrated hydrochloric acid had been contained. The obtained uniform mixture was stirred at 85° C. to form an aqueous solution of polyvinyl alcohol. The solution was cooled to 80° C. and then mixed with 9.7 g of paraaldehyde. The reaction was effected at 80° C. for 6 hours while the mixture was stirred. Neutralization was effected with NaOH. Film was obtained from the product mixture with a table coater and had a thickness of 20 microns. The product was found to have an acetoacetalization degree of 22.4 mol %, according to the method as shown in Example 1.

The products obtained in Examples 10, 11 and 12 were examined in the same way as shown in Example 1 and the results are shown in Tables 6 to 10.

TABLE 6

| | | Viscosity Degree of Average Polymerization of Starting PVA | Vinyl Alcohol (mol. %) | Vinyl Acetal | | | Vinyl Acetate (mol. %) |
|---|---|---|---|---|---|---|---|
| | | | | Aldehyde | Average Alkyl Chain Length R | Degree of Acetalization (mol. %) | |
| Examples | 10 | 200 | 79.8 | Paraldehyde | 1.00 | 19.9 | 0.3 |
| | 11 | 500 | 76.4 | Paraldehyde | 1.00 | 23.0 | 0.6 |
| | 12 | 500 | 76.9 | Paraldehyde | 1.00 | 22.4 | 0.7 |

TABLE 7

| | | Examples | | |
|---|---|---|---|---|
| Evaluation Items | Conditions | 10 | 11 | 12 |
| Water Solubility, 10° C., City Water | untreated | 35–44 | 39–41 | 37–48 |
| Heat Resistance (Water Solubility) | 50° C., 30 days | 33–45 | 36–43 | 37–46 |
| | 40° C., RH 80%, 30 days | 36–44 | 32–41 | 34–40 |
| Acid Resistance | | | | |

TABLE 7-continued

| Evaluation Items | Conditions | Examples | | |
|---|---|---|---|---|
| | | 10 | 11 | 12 |
| Water Solubility Acetalization Degree | PH = 2 40° C., 20 days untreated PH = 2 40° C., 20 days | 35–45 19.9 20.4 | 37–42 23.0 22.7 | 36–43 22.4 22.8 |
| Alkali Resistance Water Solubility Acetalization degree | in Na$_2$CO$_3$, 40° C., 20 days untreated in aqueous NaOH solution 40° C., 20 days | 36–42 19.9 19.6 | 34–41 23.0 22.6 | 36–40 22.4 22.2 |
| Heat Sealing Property | 140° C., 1 second | * | * | * |

* observed

TABLE 8

| | Specific Gravity | | | |
|---|---|---|---|---|
| | Untreated | 50° C., 30 Days | 40° C., RH 80%, 30 Days | 140° C., 1 Hour |
| Examples | | | | |
| 10 | 1.2700 | 1.2700 | 1.2700 | 1.2700 |
| 11 | 1.2700 | 1.2700 | 1.2700 | 1.2700 |
| 12 | 1.2700 | 1.2700 | 1.2700 | 1.2700 |

TABLE 9

| | Thermal Properties | |
|---|---|---|
| | Melting Point (°C.) | Thermal Decomposition-Initiating Temperature (° C.) |
| Examples | | |
| 10 | 162 | 244 |
| 11 | 160 | 242 |
| 12 | 162 | 241 |

TABLE 10

| | Turbidity Time t½ (hours) | Change of State | | | |
|---|---|---|---|---|---|
| | | 30 hours | 53 hours | 95 hours | 200 hours |
| Examples | | | | | |
| 10 | very long | transparent | transparent | transparent | transparent |
| 11 | very long | transparent | transparent | transparent | transparent |
| 12 | very long | transparent | transparent | transparent | transparent |

EXAMPLE 13

The acetoacetalized polyvinyl alcohol obtained in Example 4 was dissolved in water to obtain a 25 wt. % solution. Eight parts by weight, based on 100 parts by weight of the acetoacetalized polyvinyl alcohol, of glycerine was added to the solution to obtain another uniform solution. A sheet of polyethylene terephthalate 100 microns thick was coated with the latter solution and dried at 100° C. for 3 minutes. After cooling, the obtained film was peeled out of the polyethylene terephthalate sheet, and found to have a 25 micron thickness and a weight of 30 g/m2.

The film was cut to have a weight of 80 mm × 90 mm. Two (2) sheets of film were placed one upon the other and sealed along three edges by heating at an end portion along a 5 mm width to form a pouch.

The pouch was charged with 30 g of a powder detergent containing 25 wt. % of straight soidum (C12 to C13) alkyl benzene sulfonate, 10 wt. % of sodium salt of a C14 to C15 alkyl sulfate, 1 wt. % of soap, 3 wt. % of polyoxyethylene (10 moles) alkyl (C12 to C113) ether, 20 wt. % of zeolite, 25 wt. % of caustic soda, 5 wt. % of sodium metasilicate, 3 wt. % of usual additives such as dyes and perfumes, 6 wt. % of volatile matters and 2 wt. % of sodium sulfate. After forcing out the air from the pouch, the pouch was sealed on the remaining edge by heating. Heating of the pouch was effected at 140° C.

An automatic washing machine having a capacity of 40 liters was operated after being charged with 40 liters of city water at 10° C. and one pouch of the detergent. Stirring inside the machine was continued until the pouch had been broken or in 5 minutes after beginning the agitation or stirring. A wire net having 12 mesh was cut out to form a circle having a diameter of 150 mm. All the water inside the machine was passed through the wire net at a rate of 1 liter per 10 seconds per surface. In addition, when broken pieces of the pouch were found on the wall of the machine, they were washed with water which was also passed through the net. This way the amount of insoluble materials of the pouch was collected and measured by counting the number of nets clogged with the broken pieces of the pouch. The results are shown in Table 11 in terms of the amount of the insoluble material and at a point of time when the pouch was broken. The same test was repeated after a pouch had been allowed to stand at 40° C. or 50° C. at a relative humidity of 80 % for 30 days.

EXAMPLES 14 and 15 AND COMPARATIVE EXAMPLES 11, 12 and 13

A film was obtained in the same manner as described in Example 13 by using the acetoacetalized polyvinyl alcohol obtained in Example 5, the formacetalized and acetoacetalized polyvinyl alcohol obtained in Example 8, the n-butyralized polyvinyl alcohol obtained in Comparative Example 3, the acetoacetalized polyvinyl alcohol obtained in Comparative Example 5 and the acetoacetalized polyvinyl alcohol obtained in Comparative Example 8, respectively. Pouches were prepared and examined in the same manner as described in Example 13. The results are shown in Table 11.

In the Table, the label "Amount of the insoluble material just after formation of a pouch" refers to the case where a pouch of detergent was put into a washing machine filled with water just after the pouch had been produced. The washing machine was then run for 5 minutes. The water in the machine was passed through the wire net to collect the insoluble portion of the pouch and the number of meshes in the net clogged with pieces of the broken pouch was counted.

The label "Time of breaking just after formation of a pouch" refers to the case where a pouch was placed into a washing machine filled with water just after the pouch had been produced. The washing machine was run until the pouch was broken and it was determined how long it had taken until the pouch was broken.

The same tests were conducted after a pouch had been allowed to stand for a certain period of time.

Results are shown in terms of the number of the meshes in the wire net which are clogged with insoluble materials and in terms of seconds at the time of breaking.

It is shown in the results that the pouch of the example was completely dissolved in water, while that of the comparative example was not dissolve after it had been allowed to stand for a certain time. The pouch of the example was dissolved in water in a shorter period of time than that of the the comparative example.

TABLE 11

|  | Example | | | Comparative Example | | |
| --- | --- | --- | --- | --- | --- | --- |
|  | 13 | 14 | 15 | 11 | 12 | 13 |
| Amount of the insoluble material just after formation of a pouch | 0 | 0 | 0 | 0 | 550 | 0 |
| after 30 days at 50° C. | 0 | 0 | 0 | 430 | 500 | 580 |
| after 30 days at 40° C. | 0 | 0 | 0 | 380 | 490 | 570 |
| Time of breaking |  |  |  |  |  |  |
| Just after formation of a pouch | 10 | 10 | 9 | 17 | 16 | 15 |
| after 30 days at 50° C. | 13 | 14 | 13 | 30 | 18 | 18 |
| after 30 days at 40° C. | 12 | 12 | 13 | 25 | 17 | 18 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A detergent dispenser which comprises a pouch containing a powder detergent, wherein the pouch comprises a cold water-soluble compound of a polyvinyl alcohol derivative containing 70 to 90 mol % of vinyl alcohol units, 0 to 2 mol % of vinyl acetate units and 10 to 30 % of acetalized vinyl alcohol units having the formula:

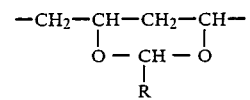

in which R is an alkyl group having 0.34 to 170 carbon atoms on the average, and having a viscosity-average polymerization degree of 200 to 500 with respect to the vinyl monomer units, said polyvinyl alcohol derivative being prepared by reacting completely saponified polyvinyl alcohol with at least one aldephyde having the formula R-CHO to effect acetalization.

2. The detergent dispenser as claimed in claim 1, in which R is CH3.

3. The detergent dispenser as claimed in claim 1, in which said acetalized vinyl alcohol units have two or more alkyl groups in the R group.

* * * * *